(12) United States Patent
Okumoto et al.

(10) Patent No.: US 7,580,095 B2
(45) Date of Patent: Aug. 25, 2009

(54) SUBSTRATE FOR DISPLAY DEVICE

(75) Inventors: Yoshitaka Okumoto, Kashihara (JP);
Keiichi Tanaka, Tenri (JP); Atsuhito Murai, Tokyo (JP); Yasutoshi Murakami, Kashiba (JP); Satoru Kishimoto, Yamatokoriyama (JP); Hirokazu Yoshioka, Tenri (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 120 days.

(21) Appl. No.: 11/248,571

(22) Filed: Oct. 13, 2005

(65) Prior Publication Data

US 2006/0082721 A1 Apr. 20, 2006

(30) Foreign Application Priority Data

Oct. 20, 2004 (JP) ............................. 2004-305618

(51) Int. Cl.
G02F 1/1335 (2006.01)
G02F 1/1333 (2006.01)

(52) U.S. Cl. ..................................... 349/110; 349/106

(58) Field of Classification Search ................ 349/106, 349/110–111; 430/7
See application file for complete search history.

(56) References Cited

U.S. PATENT DOCUMENTS

| | | | | |
|---|---|---|---|---|
| 5,833,507 | A * | 11/1998 | Woodgate et al. | 445/24 |
| 6,861,659 | B2 * | 3/2005 | Tanabe | 250/559.4 |
| 6,999,151 | B2 * | 2/2006 | Taguchi et al. | 349/155 |
| 7,230,669 | B1 * | 6/2007 | Tashiro et al. | 349/153 |
| 2004/0009303 | A1 | 1/2004 | Ito et al. | |
| 2004/0229139 | A1 | 11/2004 | Tanaka et al. | |
| 2005/0110925 | A1 * | 5/2005 | Chari et al. | 349/113 |

FOREIGN PATENT DOCUMENTS

| | | |
|---|---|---|
| JP | 8-106084 A | 4/1996 |
| JP | 8-220331 A | 8/1996 |
| JP | 8-271720 A | 10/1996 |
| JP | 11-326625 | 11/1999 |
| JP | 2001/237067 | 8/2001 |
| JP | 2002/123067 | 8/2001 |
| JP | 2002/122722 A1 | 4/2002 |
| JP | 2002/134032 A1 | 5/2002 |
| JP | 2003-270422 | 9/2003 |
| JP | 2004/029831 A1 | 1/2004 |
| JP | 2004-268028 | 9/2004 |
| JP | 2005128409 * | 5/2005 |

* cited by examiner

*Primary Examiner*—James A Dudek
(74) *Attorney, Agent, or Firm*—Birch, Stewart, Kolasch & Birch, LLP (57) ABSTRACT

The present invention provides a substrate for display device, in which display quality can be improved by suppressing generation of a region not filled with liquid material for functional film (ink) in formation of a functional film, such as a colored layer in a color filter substrate of a liquid crystal display device and an organic layers such as a luminous layer and a positive hole transporting layer in an organic electroluminescent display device, by an application method such as an ink jet method, and a liquid crystal display panel, a liquid crystal display device and an organic electroluminescent device each comprising the substrate for display device. The substrate for display device according to the present invention comprises a bank on the substrate, the bank having a structure with a chamfered corner.

28 Claims, 7 Drawing Sheets

SUBSTRATE FOR DISPLAY DEVICE

REFERENCE TO RELATED APPLICATION

This Nonprovisional application claims priority under 35 U. S. C. § 119(a) on Patent Application No. 2004-305618 filed in Japan on Oct. 20, 2004, the entire contents of which are hereby incorporated by reference.

BACKGROUND OF THE INVENTION

1. Field of the Invention

The present invention relates to a substrate for display device, a liquid crystal display panel, a liquid crystal display device and an organic electroluminescent display device. More specifically, the present invention relates to a substrate for display device suitably used as a color filter substrate for color liquid crystal display device and the like, and a liquid crystal display panel, a liquid crystal display device and an organic electroluminescent device each comprising the substrate for display device.

2. Description of the Related Art

Recently, there is growing demand for a liquid crystal display, especially a color liquid crystal display with expansion of market of liquid crystal TV. For much more spread of this color liquid crystal display in future, reduction of production costs are needed. Especially, it is necessary to provide a cheaper color filter (CF) substrate.

With the above needs, an ink jet method has been studied for formation of a colored layer in a CF substrate. In formation of a CF substrate by an ink jet method, for example, a black matrix is firstly formed on a substrate, and then a colored layer is formed by applying an ink to a pixel region, which is an opening in the black matrix, using an ink jet printer. The formation process of the colored layer by such an ink jet method has an advantage of low costs because photolithography is not necessary to use.

Figure 6A:
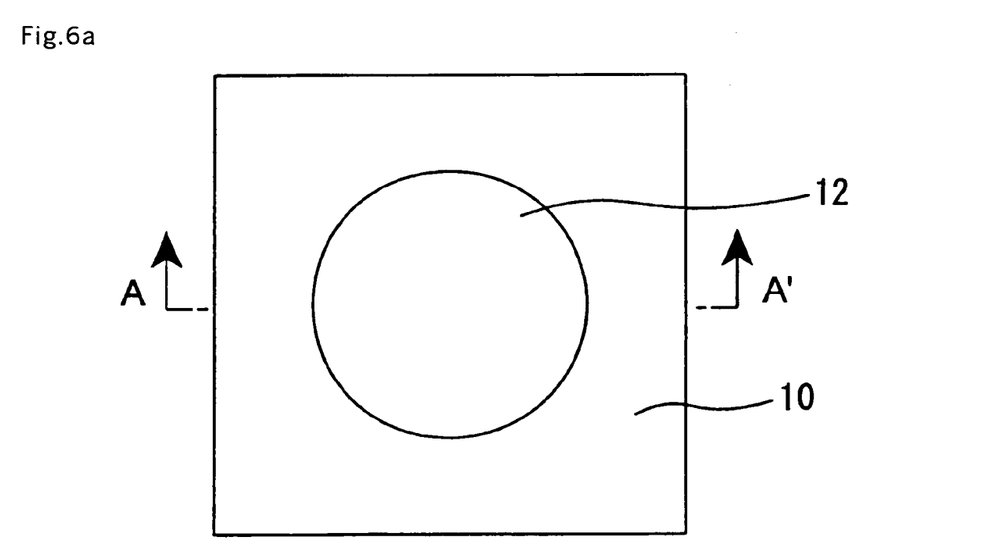
FIG. 6a is a plane view schematically showing a shape of a small droplet on a substrate.
Figure 6B:
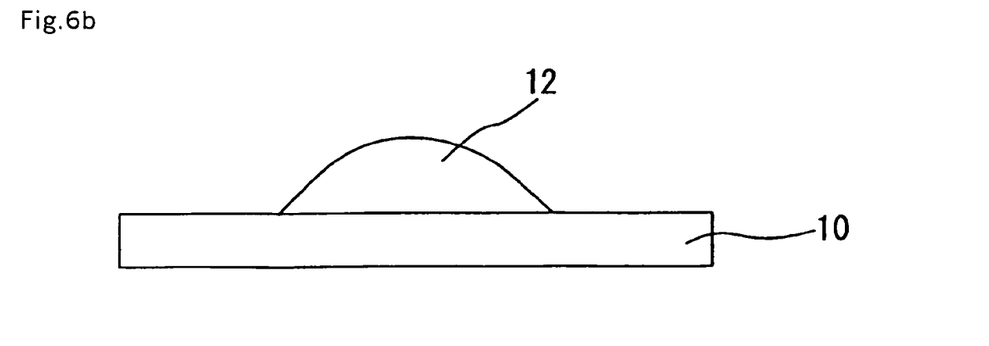
FIG. 6b is a cross-sectional view schematically showing a cross section of the small droplet in FIG. 6a taken along line A-A'.
Figure 7A:
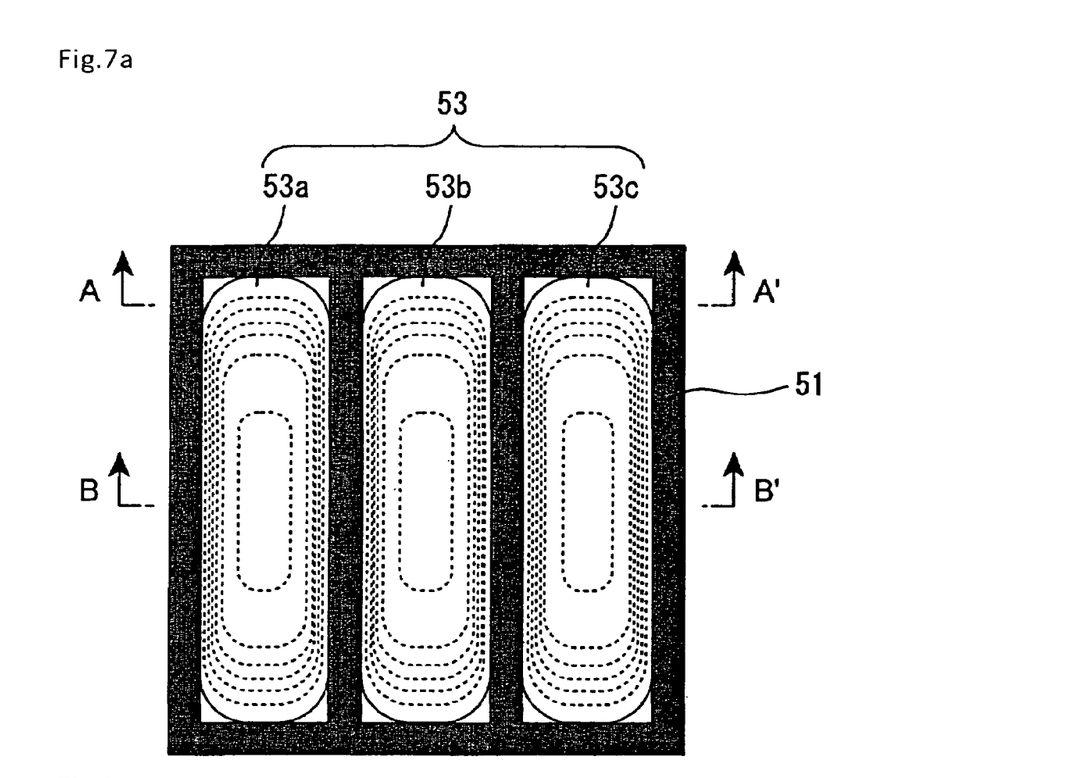
FIG. 7a is a plane view schematically showing an example of a pixel configuration in a conventional CF substrate.
Figure 7B:
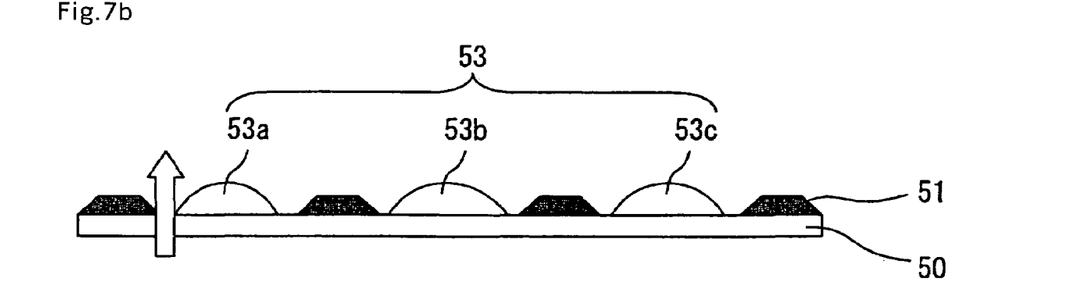
FIG. 7b is a cross-sectional view schematically showing a cross section of the CF substrate in FIG. 7a taken along line A-A'.
Figure 7C:
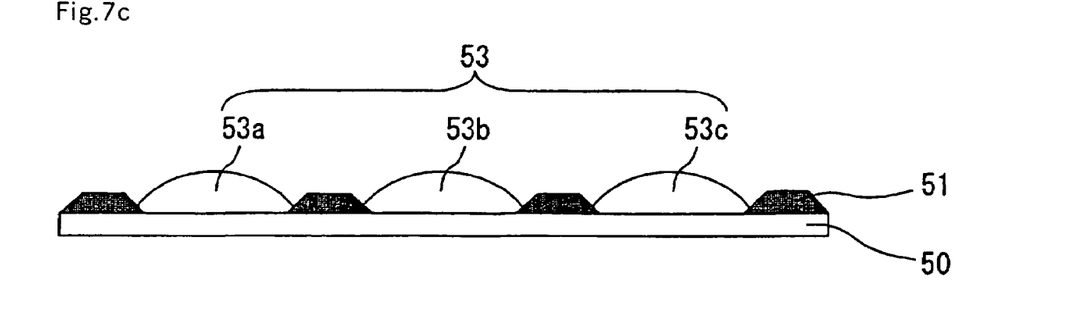
FIG. 7c is a cross-sectional view schematically showing a cross section of the CF substrate in FIG. 7a taken along line B-B'. A dotted line in FIG. 7a expresses a contour line of each colored layer 53.
Figure 8A:
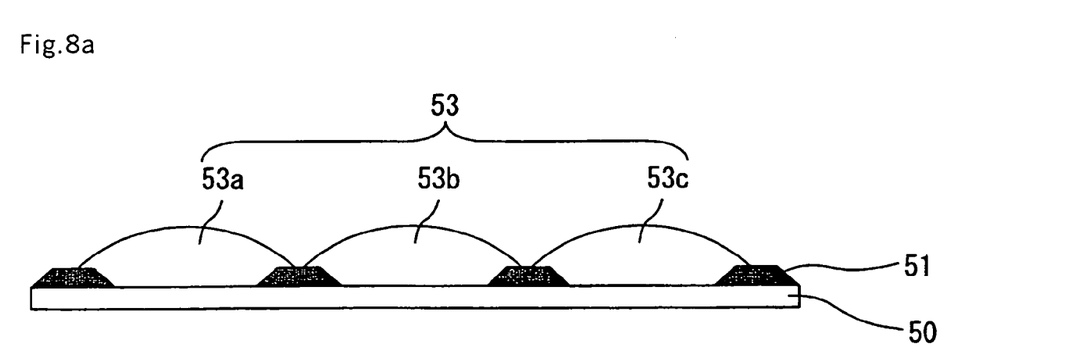
FIG. 8a is a cross-sectional view schematically showing a pixel in which color mixture is not generated in the CF substrate.
Figure 8B:
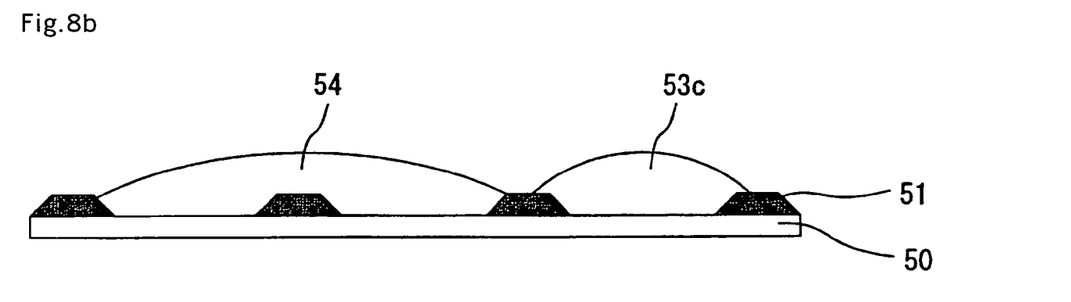
FIG. 8b is a cross-sectional view schematically showing a pixel in which color mixture is generated.

However, a droplet on the substrate has a shape of part of sphere as shown in FIG. 6. Therefore, the droplet applied to the pixel region of the CF substrate has a thinner thickness in the periphery of the pixel region, especially in four corners (FIG. 7b) of the rectangular pixel region as shown in FIG. 7, although it has a sufficient thickness in the central part (FIG. 7c) of the pixel region. Accordingly, unevenness of color density within the pixel may occur, leading to reduction in display quality of display images. In FIG. 7b, the outline arrow expresses light leakage. On the other hand, when the amount of the droplet is increased and spread on the black matrix as shown in FIG. 8a in order to suppress the light leakage, it becomes easy to cause color mixture because ink droplets are mixed (leaked) with each other between adjacent pixels as shown in FIG. 8b.

Japanese Kokai Publication Hei-08-220331 discloses an invention to form chamfered corner parts of a CF (colored layer) in etching process of the CF formed by application as an art to suppress embossment in the corner parts of the CF when the CF is prepared in the photo process. However, the invention disclosed in Japanese Kokai Publication Hei-08-220331 is not an art suitable for solving the above-mentioned problems in that an ink jet method is not assumed as a formation process of the colored layer; an art, in which a portion worsening display quality is removed from the colored layer, is used for improving display quality; and the invention has an object to prevent defect in a cell gap to uniform the cell cap.

Also, Japanese Kokai Publication Hei-08-106084 discloses an invention to provide a chamfered part in advance at an end of a corner of a photomask pattern for forming pattern as an art in order to prevent generation of protruding-shape resist residues in corner parts of the pattern at the time of forming a resin black matrix. However, the invention disclosed in Japanese Kokai Publication Hei-08-106084 is not an art suitable for solving the above-mentioned problems in that the invention has an object to prevent display unevenness caused by variation in size of the resist residues of protruding shape.

Furthermore, Japanese Kokai Publication Hei-08-271720, discloses a CF (CF substrate) having excel lent smoothness and less decolored portions, in which at least one of four angle parts of substantially rectangular apertures is substantially circular arc shape, and the adjacent apertures colored with different colors from each other are partitioned by a color mixture preventive wall. However, there is no description in Japanese Kokai Publication Hei-08-271720 about a configuration of the color mixture preventive wall suitable for solving the above-mentioned problems.

SUMMARY OF THE INVENTION

The present invention was made in view of the above state of the art, and has an object to provide a substrate for display device, capable of improving display quality by suppressing generation of a region not filled with liquid material for functional film information of a functional film by an application method such as an ink jet method, and a liquid crystal display panel, a liquid crystal display device and an organic electroluminescent device each comprising the substrate for display device.

The inventors of the present invention have studied on measures to suppress generation of a non-filled region in formation of a functional film by an application method such as an ink jet method. And they have noted a configuration of a bank (color mixture preventive wall) formed on a substrate. Furthermore, the inventors have found that chamfering the corner of the bank can suppress generation of the non-filled region in a corner inside the bank in formation of a functional film by applying liquid material for functional film to a substrate. Thereby the above-mentioned problems have been solved, leading to completion of the present invention.

That is, the present invention relates to a substrate for display device comprising a bank on the substrate, the bank having a structure with a chamfered corner.

BRIEF DESCRIPTION OF THE DRAWINGS

FIG. 5b is a view for explaining a straight line chamfering in the periphery of light-shielding part of TFT and the like.

EXPLANATION OF NUMERALS AND SYMBOLS 10, 50: Glass substrate
11, 51: Black matrix (BM)
12: Small droplet (Ink)
13, 53: Colored layer
13a, 53a: First colored layer (red; R)
13b, 53b: Second colored layer (green; G)
13c, 53c: Third colored layer (blue; B)
54: Color-mixtured layer

DETAILED DESCRIPTION OF THE INVENTION

The present invention relates to a substrate for display device comprising a bank on the substrate, the bank having a structure with a chamfered corner. In the present invention, the bank is not especially limited as long as it is a structure (projection) for separating a plurality of regions forming functional film from each other. The bank has a structure in which part or whole of corners is chamfered, but preferably has a structure in which each corner is chamfered.

In the case where a planar shape of a region inside the bank (region forming functional film) is formed of polygon such as a rectangle, because surface tension makes the droplet globular shape, a droplet ejected on a substrate can secure a sufficient thickness as a functional film in the central part inside the bank region but can not secure a sufficient thickness as a functional film in a corner inside the bank region because the droplet is insufficiently spread into the corner inside the bank region. For example, in the case where a colored layer is formed as a functional film in a color filter substrate by an ink jet method, the colored layer certainly has a planar shape with a circular edge. As a result, the planar shape causes light leakage in the corner of the pixel region (region inside the bank), leading to reduction of display quality. In order to prevent film thickness reduction of the colored layer (ink) in the corner of the pixel region, the amount of the droplet may be simply increased and spread on the bank (black matrix). However, in this case, inks are mixed between the adjacent pixel regions, easily causing a defect pixel. In the present invention, the corner of the bank are chamfered with straight line or curve corresponding to a shape of a droplet which easily becomes a globular shape, and then part generating light leakage due to insufficient film thickness is previously covered with the bank. Thereby, thickness of the colored layer can be more uniform. As a result, light leakage from the corner of the pixel region can be prevented, leading to improvement in display quality of a display device in which the color filter substrate is used.

Conventionally, in the case of a black matrix (BM), a corner is chamfered corresponding to a direction of rubbing in order to mainly solve unevenness at the time of rubbing. Therefore, in this case, light leakage caused when a colored layer of a color filter substrate is prepared by an ink jet (IJ) process can be insufficiently solved.

It is preferable that the substrate for display device according to the present invention further comprising a functional film provided inside the bank. The functional film is preferably formed by ejecting liquid material inside the bank by an application method such as an ink jet method. In this case, the functional film has the following features: (1) the functional film is composed of a solidified ink; (2) the functional film has a cross section of substantially semielliptic shape; (3) a contour pattern of the functional film has a shape similar to an outline of the bank surrounding the functional film, and so on. Each configuration of the functional film in the above-mentioned (1) to (3) is a preferable embodiment of the present invention. These configurations can sufficiently exhibit operational advantages of the present invention. The functional film is not especially limited as long as it contains a functional material such as a coloring material and a conductive material. And examples of the functional film include a colored layer in a color filter substrate of a liquid crystal display device, organic layers such as a luminous layer and a hole-transport layer in an organic electroluminescent display device, and a wiring and a pixel electrode in a wiring substrate such as a thin film transistor (TFT) array substrate. The solidified ink is not especially limited as long as it is a solid material obtained by drying and solidifying liquid material (ink) capable of being ejected from an ink jet device. The terms "the functional film has a cross section of substantially semielliptic shape" means that the functional film has a cross sectional shape with an inclination from the center part, which is a top part, to the both ends. The terms "a contour pattern of the functional film has a shape similar to an outline of the bank surrounding the functional film" means that a contour of the functional film and the outline constituting the inner circumference of the bank surrounding the functional film have substantially similar shape.

It is preferable that a whole of the bank is composed of a light-shielding material. Because of such a configuration, the bank can be used as a light-shielding material (black matrix) which separates functional films constituting pixels with colors different from one another. In the case where the bank serves also as a shielding member, the bank is preferably formed in a stripe shape and has a comb tooth-like overhanging part, and the overhanging part has a structure with a chamfered corner. In the case where the bank serving also as a shielding member is provide in a stripe-shaped plane pattern, the overhanging part (projection) for shielding a switching element and the like, such as a thin film transistor (TFT) is provided in a comb-tooth shape. However, there is a possibility that a non-filled region of a functional film may generate also in a corner of the overhanging part. Accordingly, the corner of the comb tooth-like overhanging part is chamfered, and thereby generation of the non-filled region is effectively suppressed.

Figure 5A:
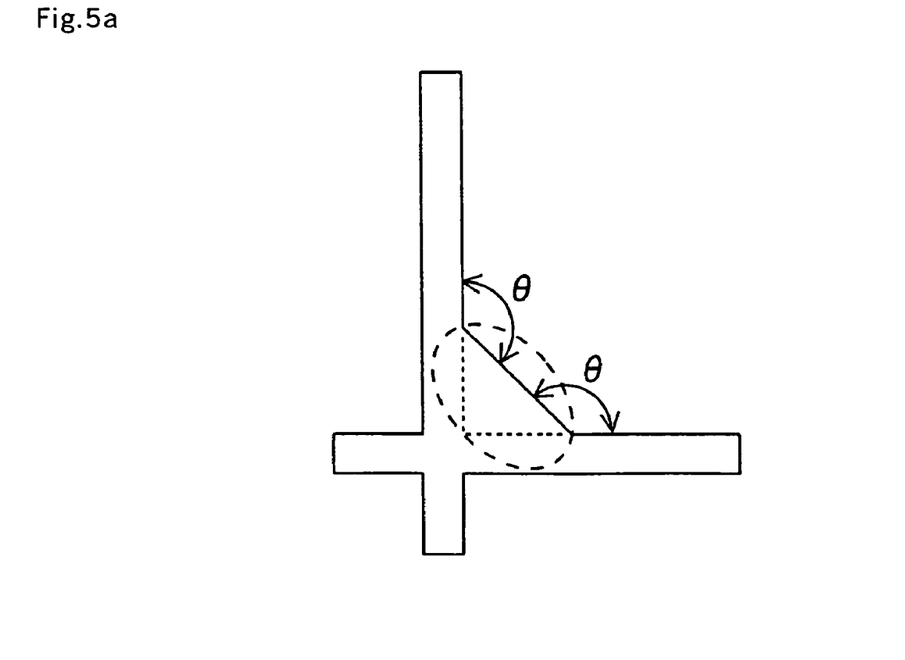
FIG. 5a is a view for explaining a straight line chamfering.
Figure 5B:
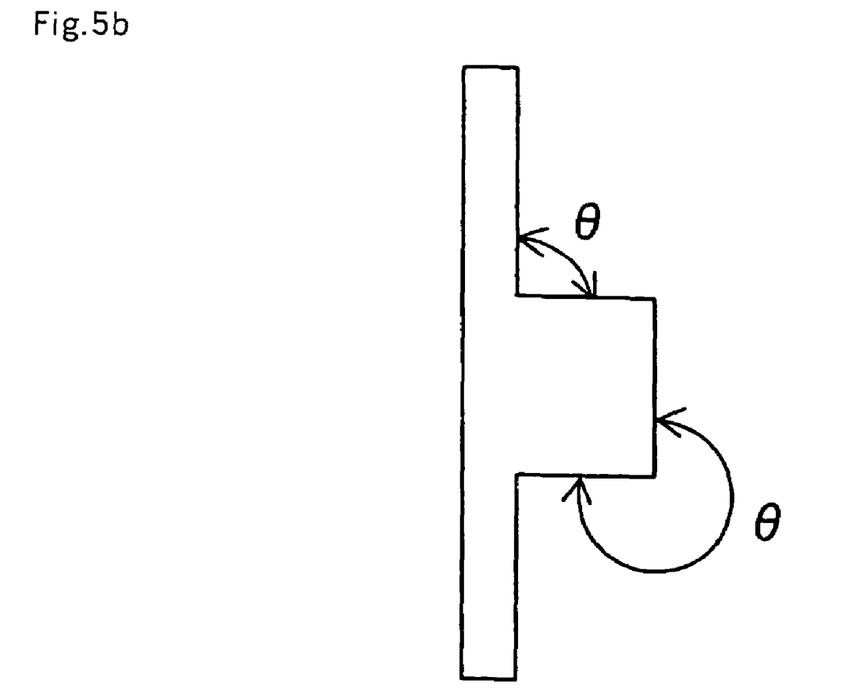
Figure 5C:
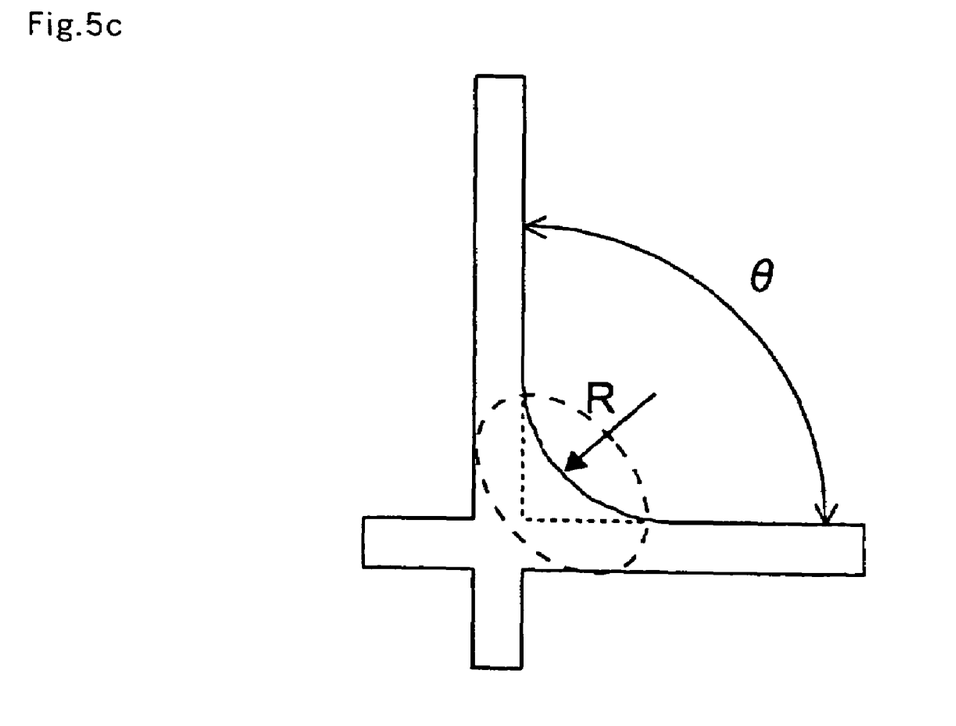
FIG. 5c is a view for explaining a circle chamfering.
Figure 5D:
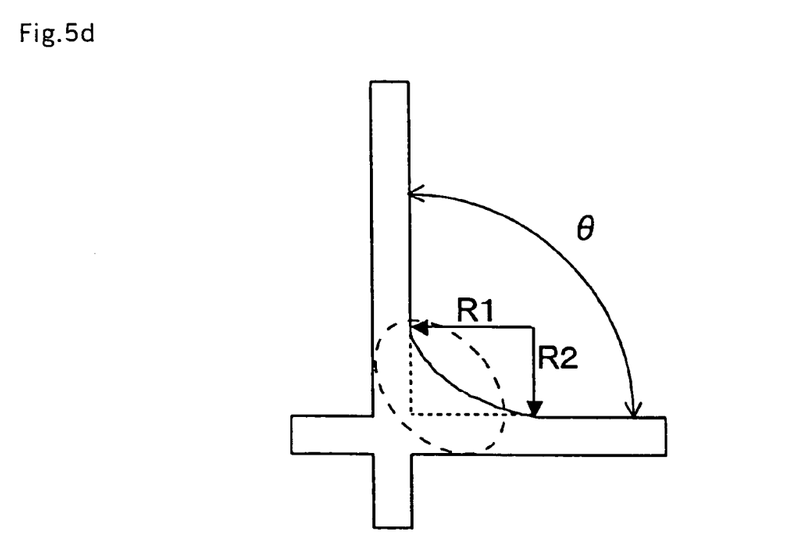
FIG. 5d is a view for explaining an ellipse chamfering.

Examples of preferable configurations of the bank include a (4) configuration in which each corner of the bank has an interior angle of more than 90° and less than 270°, a (5) configuration in which each corner of the bank has an outline composed of part of a circle with a radius of 10 μm or more, a (6) configuration in which each corner of the bank has an outline composed of part of an ellipse with a minor axis of 10 μm or more and a ratio of minor axis to major axis of 0.7 or more and less than 1.0. The above-mentioned configurations (4) to (6) may sufficiently exhibit operational advantages of the present invention. In the configuration (4), an interior angle θ of the corner can be determined based on FIG. 5a to d. In the configuration (5), a radius R of a circle which constitutes an outline of the corner can be determined based on FIG. 5c. In the configuration (6), a major axis R1 and a minor axis R2 of the ellipse which constitutes an outline of the corner can be determined based on FIG. 5d. The portion surrounded by a dotted line in figures is a chamfered part.

It is preferable that in the substrate for display device according to the present invention, an area ratio of a chamfered part is 5% or more to a total area of the chamfered part and inside the bank (aperture area). The terms "area of a chamfered part" means an area of a bank region corresponding to a chamfered structure. The configuration may sufficiently exhibit operational advantages of the present invention. The area ratio of the chamfered part is more preferably 10% or more to a total area of the chamfered part and the aperture area. The area ratio of the chamfered part is preferably 20% or less to a total area of the chamfered part and the aperture part in view of secure of aperture ratio.

It is preferable that the substrate for display device according to the present invention has part with ink repellency and part with ink affinity, a contact angle of the part with ink repellency to an ink material is 50° or more and a contact angle of the part with ink affinity to the ink material is 35° or less. The configuration may sufficiently exhibit operational advantages of the present invention. It is more preferable that the contact angle of the part with ink repellency to an ink material is 60° or more and the contact angle of the part with ink affinity to the ink material is 20° or less.

The substrate for display device of the present invention is preferably a color filter substrate. Such a substrate may suppress generation of a non-filled region of a colored layer in a corner inside a bank in formation of the colored layer by an application method such as an ink jet method, and thereby prevent light leakage in the peripheral region of a pixel.

The configuration of the substrate for display device of the present invention is not especially limited as long as it has the above-mentioned features and components which a substrate for display device usually comprises. For example, in the case of a color filter substrate, the substrate usually has a configuration in which colored layers of three colors of red, green, and blue, and a bank separating the colored layers from each other are provided in each pixel, and thereon a protective film, a counter electrode, an alignment film and the like are stacked. The present invention also relates to a liquid crystal display panel and a liquid crystal display device each comprising the substrate for display device. Such a liquid crystal display panel and liquid crystal display device of the present invention may attain high display quality free from light leakage in the peripheral region of a pixel when using an application method such as an ink jet method in formation of a colored layer. The present invention also relates to an organic electroluminescent display device comprising the substrate for display device. Such an organic electroluminescent display device of the present invention may attain high display quality free from display unevenness in the peripheral region of a pixel when using an application method such as an ink jet method in formation of an organic layer such as a luminous layer.

According to the substrate for display device of the present invention, generation of light leakage caused by a non-filling of liquid material for functional film in edges of the aperture part (four corners of a pixel) is prevented in formation of a functional film by an application method such as an ink jet method, because the bank has a structure with a chamfered corner and the aperture part surrounded by the bank has a planar shape corresponding to that of a droplet on the substrate, and therefore reduction in display quality of display image can be prevented.

The present invention will, hereinafter, be described in more detail with reference to Examples, but the present invention is not limited to these Examples.

Embodiment 1

Figure 1A:
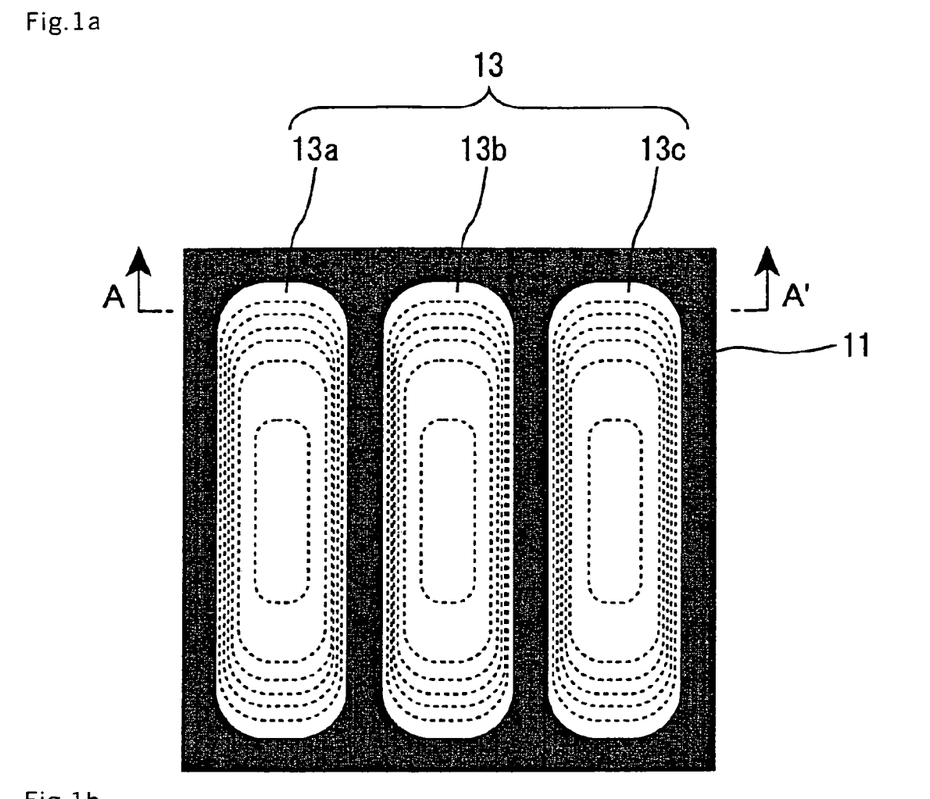
FIG. 1a is a plane view schematically showing a pixel configuration in a color filter (CF) substrate according to Example 1.
Figure 1B:
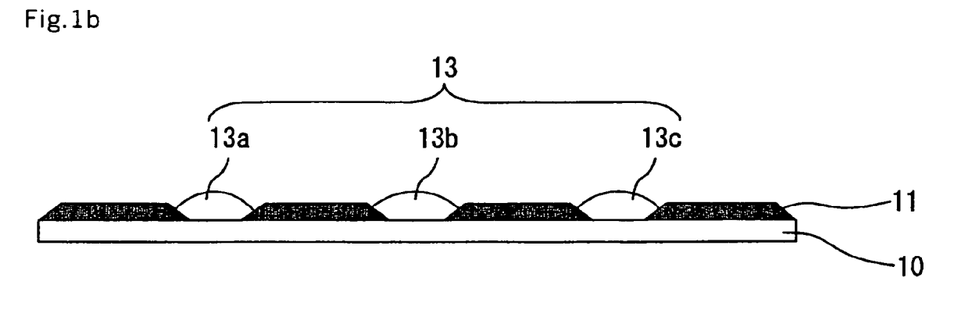
FIG. 1b is a cross-sectional view showing a cross section of the CF substrate in FIG. 1a taken along line A-A'. A dotted line in FIG. 1a expresses a contour line of each colored layer 13.

FIG. 1a is a plane view schematically showing a pixel configuration in a color filter (CF) substrate according to Example 1. FIG. 1b is a cross-sectional view showing a cross section of the CF substrate in FIG. 1a taken along line A-A'. A dotted line in FIG. 1a expresses a contour line of each colored layer 13.

It is known that when an ink is ejected by an ink jet (IJ) method, a droplet of the ink spreads to form into a globular shape, and therefore thickness of the ink becomes thinner in four corners of a rectangular pixel region. In view of this point, the CF substrate of the present embodiment has four corners (the corner) of the pixel region chamfered so as to form into a circular shape with a radius of 10 μm or more as shown in FIG. 1a, and a portion which would have a thinner ink thickness was previously covered with a black matrix (BM, bank) 11 as shown in FIG. 1b. Accordingly, display quality can be improved by suppressing light leakage from the four corners of the pixel region according to the CF substrate of the present embodiment. The colored layer 13 formed by an IJ method generally has a contour pattern shown in FIG. 1. Therefore, in order to minimize reduction of an aperture ratio caused by the chamfering on the four corners of the pixel region, the corners are preferably chamfered so that a contour pattern of the colored layer 13 has a shape similar to a planar shape pattern of the BM 11. Specifically, when the four corners are chamfered so as to have a circular or polygonal shape, an aperture area is easily secured because a droplet easily becomes a globular shape. The shape of chamfering is not limited to a circular shape, and may be an ellipse or a polygon, for example.

Embodiment 2

Figure 2:
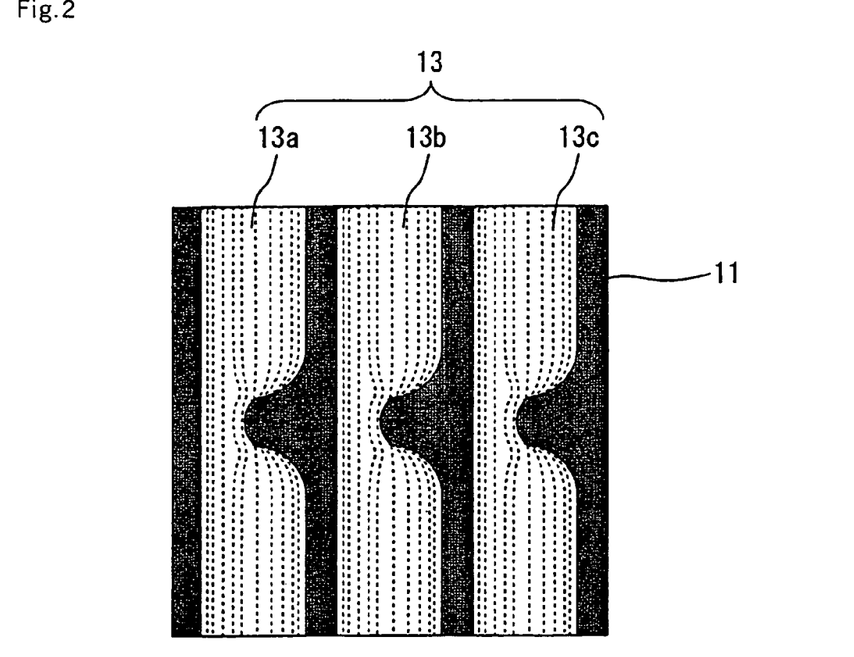
FIG. 2 is a plane view schematically showing a pixel configuration in a color filter (CF) substrate according to Example 2. A dotted line in FIG. 2 expresses a contour line of each colored layer 13.

FIG. 2 is a plane view schematically showing a pixel configuration in a color filter (CF) substrate according to Example 2. A dotted line in FIG. 2 expresses a contour line of each colored layer 13. In a stripe-shaped BM (bank) 11 of the CF substrate according to the present embodiment, a comb tooth-like overhanging part was chamfered so as to have a circular (curvilinear) corner as shown in FIG. 2. That is, part projecting to a pixel region (the comb tooth-like overhanging part) had a trapezoidal shape and the corner of the trapezoid was chamfered with curve. The comb tooth-like overhanging part is provided in order to shield a thin film transistor (TFT) from light and to dispose a spacer. Accordingly, display quality can be improved by suppressing light leakage in the periphery of the overhanging part according to the CF substrate of the present embodiment. The preferred chamfered shape and the like is the same as in Example 1.

Embodiment 3

Figure 3:
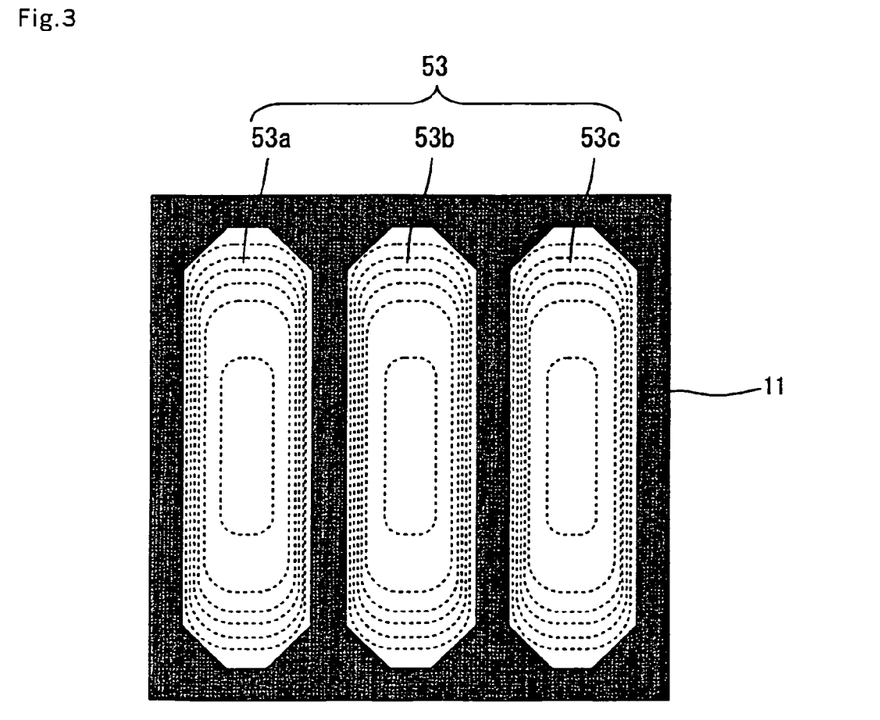
FIG. 3 is a plane view schematically showing a pixel configuration in a color filter (CF) substrate according to Example 3. A dotted line in FIG. 3 expresses a contour line of each colored layer 13.

FIG. 3 is a plane view schematically showing a pixel configuration in a color filter (CF) substrate according to Example 3. A dotted line in FIG. 3 expresses a contour line of each colored layer 13. The CF substrate of the present embodiment has the four corners of the pixel region previously chamfered with straight line, and a portion which would have a thinner ink thickness was covered with BM (bank) 11 as shown in FIG. 3. Accordingly, light leakage from the four corners of the pixel region can be suppressed according to the CF substrate of the present embodiment.

Embodiment 4

Figure 4:
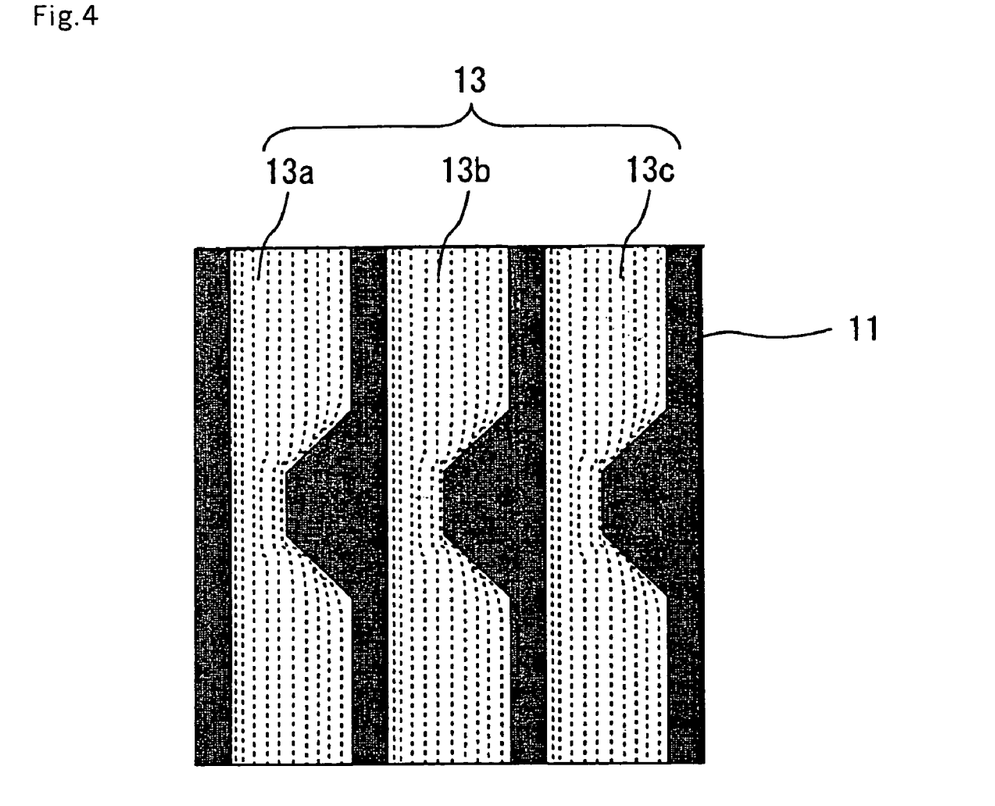
FIG. 4 is a plane view schematically showing a pixel configuration in a color filter (CF) substrate according to Example 4. A dotted line in FIG. 4 expresses a contour line of each colored layer 13.

FIG. 4 is a plane view schematically showing a pixel configuration in a color filter (CF) substrate according to Example 4. A dotted line in FIG. 4 expresses a contour line of each colored layer 13. The CF substrate of the present embodiment has the corners of the comb tooth-like overhanging part previously chamfered with straight line in a stripe-shaped BM 11 (corners), which are provided in order to shield a TFT and the like form light as shown in FIG. 4. Accordingly, light leakage in the periphery of the overhanging part can be suppressed according to the CF substrate of the present embodiment.

The following Table 1 shows the relation between the interior angle of the pixel region and display quality in the case where the corners of the BM (bank) 11 are chamfered with straight line as in Examples 3 and 4.

TABLE 1

| Angle/° | Display quality |
|---|---|
| 79 | Light leakage occurred |
| 84 | Light leakage occurred |
| 90 | Slight light leakage occurred |
| 127 | Neither light leakage nor color mixture occurred |
| 135 | Neither light leakage nor color mixture occurred |
| 146 | Neither light leakage nor color mixture occurred |
| 153 | Neither light leakage nor color mixture occurred |
| 207 | Neither light leakage nor color mixture occurred |
| 214 | Neither light leakage nor color mixture occurred |
| 225 | Neither light leakage nor color mixture occurred |
| 233 | Neither light leakage nor color mixture occurred |
| 270 | Ink spread slightly on the bank |
| 289 | Ink spread on the bank |

As shown in Table 1, in the case where the interior angle of the pixel region is 90° or less, reduction in contrast was observed because the ink did not spread into the corners and light leakage occurred. On the other hand, in the case of 270° or more, the ink spread on the BM 11, and cause defect of color mixture, defect of cell thickness and the like. Accordingly, when the chamfering is performed with straight line, the corners are preferably chamfered so that each corner of the pixel region has an interior angle of more than 90° and less than 270°.

The invention claimed is:

1. A substrate that is used to support a color filter for a display device comprising
a bank on the color filter substrate,
the bank having a structure with a chamfered corner,
wherein each corner of the bank has an outline composed of part of an ellipse with a minor axis of 10 µm or more and a ratio of minor axis to major axis of 0.7 or more and less than 1.0, and wherein the bank is formed directly on the color filter substrate.

2. The substrate for display device according to claim 1, further comprising a functional film provided inside the bank.

3. The substrate for display device according to claim 2, wherein the functional film has a cross section of substantially semielliptic shape.

4. The substrate for display device according to claim 2, wherein a contour pattern of the functional film has a shape similar to an outline of the bank surrounding the functional film.

5. A substrate for a display device comprising
a bank on the substrate,
the bank having a structure with a chamfered corner,
wherein each corner of the bank has an outline composed of part of an ellipse with a minor axis of 10 µm or more and a ratio of minor axis to major axis of 0.7 or more and less than 1.0, and wherein a whole of the bank is composed of a light-shielding material.

6. The substrate for display device according to claim 5, wherein the bank is formed in a stripe shape and has a comb tooth-like overhanging part, and the overhanging part has a structure with a chamfered corner.

7. A substrate for a display device comprising
a bank on the substrate,
the bank having a structure with a chamfered corner,
wherein each corner of the bank has an outline composed of part of an ellipse with a minor axis of 10 µm or more and a ratio of minor axis to major axis of 0.7 or more and less than 1.0, and wherein each corner of the bank has an interior angle of more than 90° and less than 270°.

8. The substrate for display device according to claim 1, wherein each corner of the bank has an outline composed of part of a circle with a radius of 10 µm or more.

9. A substrate for a display device comprising
a bank on the substrate,
the bank having a structure with a chamfered corner,
wherein each corner of the bank has an outline composed of part of an ellipse with a minor axis of 10 µm or more and a ratio of minor axis to major axis of 0.7 or more and less than 1.0, and wherein an area ratio of a chamfered part is 5% or more to a total area of the chamfered part and inside the bank.

10. The substrate for display device according to claim 1, wherein the substrate is a color filter substrate.

11. A liquid crystal display panel comprising the substrate for display device according to claim 1.

12. A liquid crystal display device comprising the substrate for display device according to claim 1.

13. An electroluminescent display device comprising the substrate for display device according to claim 1.

14. A substrate for a display device comprising
a bank on the substrate,
the bank having a structure with a chamfered corner,
wherein the substrate has part with ink repellency and part with ink affinity, a contact angle of the part with ink repellency to an ink material is 50° or more and a contact angle of the part with ink affinity to the ink material is 35° or less.

15. A substrate that is used to support a color filter for a display device according to claim 1, comprising a functional film provided inside the bank, wherein the functional film is composed of a solidified ink.

16. A substrate for a display device according to claim 5, comprising
a functional film provided inside the bank,
wherein the functional film is composed of a solidified ink.

17. A substrate for a display device according to claim 7, comprising
a functional film provided inside the bank,
wherein the functional film is composed of a solidified ink.

18. A substrate for a display device according to claim 9, comprising
a functional film provided inside the bank,
wherein the functional film is composed of a solidified ink.

19. A substrate that is used to support a color filter for a display device comprising
a bank on the color filter substrate,
the bank having a structure with a chamfered corner,
wherein each corner of the bank has an outline composed of part of an ellipse with a minor axis of 10 μm or more and a ratio of minor axis to major axis of 0.7 or more and less than 1.0 and wherein the bank forms a black matrix.

20. The substrate for display device according to claim 19, further comprising a functional film provided inside the bank.

21. The substrate for display device according to claim 20, wherein the functional film has a cross section of substantially semielliptic shape.

22. The substrate for display device according to claim 20, wherein a contour pattern of the functional film has a shape similar to an outline of the bank surrounding the functional film.

23. The substrate for display device according to claim 19, wherein each corner of the bank has an outline composed of part of a circle with a radius of 10 μm or more.

24. The substrate for display device according to claim 19, wherein the substrate is a color filter substrate.

25. A liquid crystal display panel comprising the substrate for display device according to claim 19.

26. A liquid crystal display device comprising the substrate for display device according to claim 19.

27. An electroluminescent display device comprising the substrate for display device according to claim 19.

28. A substrate that is used to support a color filter for a display device according to claim 19, comprising
a functional film provided inside the bank,
wherein the functional film is composed of a solidified ink.

\* \* \* \* \*

UNITED STATES PATENT AND TRADEMARK OFFICE
CERTIFICATE OF CORRECTION

PATENT NO.      : 7,580,095 B2
APPLICATION NO. : 11/248571
DATED           : August 25, 2009
INVENTOR(S)     : Okumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Fourteenth Day of September, 2010

David J. Kappos
*Director of the United States Patent and Trademark Office*